United States Patent [19]

Carlson et al.

[11] 4,334,973

[45] Jun. 15, 1982

[54] PROCESS FOR ELECTROPHORETICALLY FORMING AN IMIDE COATING ON WIRE

[75] Inventors: Nancy W. Carlson, Murrysville; Dean C. Westervelt, Acme; Luciano C. Scala, Murrysville, all of Pa.

[73] Assignee: Westinghouse Electric Corp., Pittsburgh, Pa.

[21] Appl. No.: 171,932

[22] Filed: Jul. 18, 1980

[51] Int. Cl.³ .............. C25D 13/06; C25D 13/10; C25D 13/16
[52] U.S. Cl. .............. 204/181 R; 204/181 C; 204/300 EC
[58] Field of Search .............. 204/181 R, 181 C

[56] References Cited

U.S. PATENT DOCUMENTS

| | | |
|---|---|---|
| 3,663,728 | 5/1972 | Hoback et al. ............ 204/181 R |
| 3,676,383 | 7/1972 | Scala et al. ............ 204/181 R |
| 3,846,269 | 11/1974 | Martello et al. ............ 204/181 R |
| 4,003,812 | 1/1977 | Scala et al. ............ 204/181 R |
| 4,019,877 | 4/1977 | Gass et al. ............ 204/181 R |

Primary Examiner—Howard S. Williams
Attorney, Agent, or Firm—R. D. Fuerle

[57] ABSTRACT

An imide containing polymeric coating is electrophoretically formed on wire from an emulsion. The emulsion contains a polymer, an organic aprotic solvent for the polymer, an amine, and a polar precipitant in which the polymer is insoluble. The wire is passed through a conductive tube immersed in the solvent while a D.C. current is applied between the tube and the wire. The polymer coating on the wire is then cured.

17 Claims, 1 Drawing Figure

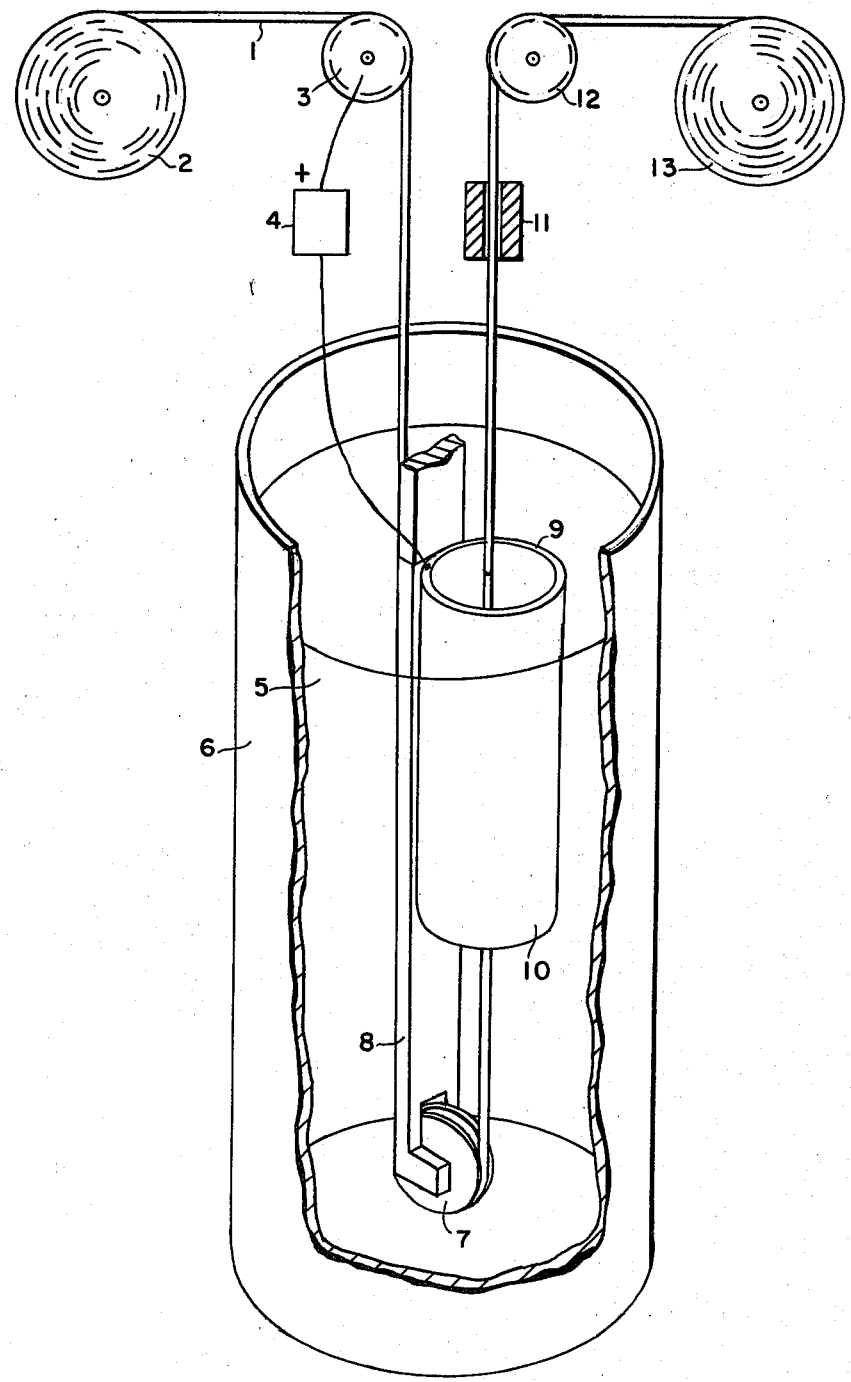

PROCESS FOR ELECTROPHORETICALLY FORMING AN IMIDE COATING ON WIRE

BACKGROUND OF THE INVENTION

The usual commercial method of forming an enamel insulating coating on a wire is, in a continuous process, to run the wire through a solution of a resin and then to evaporate the solvent and cure the resin on the wire in a hot curing tower. The coating tends to have pinholes and other discontinuities. In order to completely cover all of the metal, it is necessary to repeat the dip and curing process several times. Moreover, the coating has to be several times as thick the insulating properties of the resin require in order to provide an electric safety margin for undercoated areas. It is also difficult at times to dry and cure the resin in the wire tower because the resins in the enamel on the wire tends to skin over before all the solvent is evaporated. This problem is magnified when a high boiling solvent is present.

Attempts to coat wires in a continuous electrophoretic process have not been sufficiently successful to be widely used commercially, usually because the coating blisters during cure.

SUMMARY OF THE INVENTION

We have discovered that good insulating coatings on wire can be continuously formed electrophoretically from an emulsion using a precipitant of hydroxyethyl acetate or ethylene glycol monomethyl ether. We are able to obtain pinhole free coatings because electrophoresis causes the resin to migrate to the least insulated portion of the wire. Yet even though our coatings are flaw free, they are only about one-third as thick as the prior dip formed coatings. Because these coatings are flaw free, the insulated wire could be used in salt water applications where other types of coatings would fail.

The coating has about the same insulating characteristics as previous coatings but has better flexibility and is stronger. Also, because the coating is formed through an electrical process, it is thicker on the edges of non-round wire where the voltage stress is greatest; coatings formed by dipping are thinner at the edges. The method of this invention provides coatings up to 3 mils thick and virtually 100% utilization of the resin.

PRIOR ART

U.S. Pat. No. 4,003,812 discloses a non-aqueous colloidal polysulfone composition which can be non-continuously electrodeposited on wire using ketone non-solvents. An amine is required.

U.S. Pat. No. 3,676,383 discloses a static process for electrophoretically repairing flaws in electrical insulation. A composition is used of liquid nitroalkanes containing a resin such as a polyimide precursor.

U.S. Pat. No. 3,846,269 discloses the electrodeposition of polyimides on wire. Low boiling non-solvents are used.

U.S. Pat. No. 4,019,877 discloses electroplating copper wire with nickel, followed by electrocoating with a polyamic acid polymer to form a polyimide film.

DESCRIPTION OF THE INVENTION

The accompanying drawing is a combined isometric and diagrammatic view, partially in section, of a certain presently preferred embodiment illustrating a process according to this invention.

In the drawing, wire 1 on supply reel 2 passes over metal sheave 3 connected to a source of D.C. current 4, then down into emulsion 5 in polyethylene container 6. The wire passes under a polytetrafluoroethylene sheave 7 supported by Teflon support 8 then up through stainless steel electrode 9, which is covered with a heat-shrunk Teflon coating 10, and is connected to the other side of power source 4, completing the circuit. The polymer coated wire then passes through curing tower 11 which cures and hardens the coating. The wire passes over sheave 12 and onto take-up reel 13.

The composition of this invention is an emulsion which mainly consists of a polymer, a solvent for that resin, and a precipitant in which the resin is insoluble. The liquid phase of the emulsion is continuous and the polymer containing phase is discrete.

The polymer used is this invention is a polysulfone or a polymer which contains an amic acid group, which has the formula:

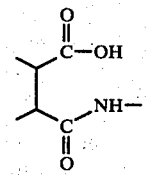

The amic acid groups in the polymer cyclize during cure to give imide groups:

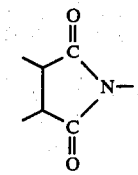

The presence of amic acid groups is believed to be necessary to achieve electrodeposition. In addition to the amic acid groups, the polymer in the emulsion may also contain amide groups and ester groups. Thus, the resulting coating may be a polyimide, a polyamide-imide, or a polyamide-imide-ester, or a polysulfone or a mixture thereof. Suitable polysulfones are disclosed in U.S. Pat. No. 4,003,812, herein incorporated by reference. A preferred polysulfone has the general formula

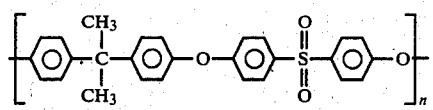

where n is 50 to 80. That material is commercially available from Union Carbide under the trade designation "P 1700 Bakelite." The polymer preferably has a molecular weight range of about 85,000 to about 100,000.

The solvent for the polymer is organic and aprotic. The preferred solvents are dimethylsulfoxide (DMSO), N-methylpyrrolidone (NMP), dimethylacetamide (DMAC), and dimethylformamide (DMF). The solvent giving the most reproducible and optimal results is NMP.

The emulsion includes an amine to react with the acid group of the polymer, forming a salt and placing a charge on the polymer so that it is electrophoretically more active. When polysulfones are used the amine placed a charge on the discrete emulsion particles. When amic acids are used the amount of amine is preferably from about 0.5 to about 3 times stoichiometric. When polysulfones are used the amount of amine is preferably about 0.8 to about 1.2 parts by weight. The amine is preferably a tertiary amine, but secondary amines, primary amines, or quaternary ammonium compounds can also be used. Examples include trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, 1-phenylimidazole and mixtures thereof. The preferred amine is 1-methylimidazole.

The precipitant is a polar liquid in which the polymer is insoluble. The precipitant is electrically conductive and is soluble in the solvent. Suitable precipitants include Cellosolve (hydroxyethyl acetate) acetate, methyl Cellosolve (ethylene glycol monomethyl ether), or mixtures thereof. These precipitants have good conductivity and boil at a high enough temperature so that they evaporate slowly in the curing tower and do not blister the coating. Ketones should not be used as they boil at too low a temperature and do not form good coatings.

The emulsion can also include a solvent extender such as xylene, toluene, or cresylic acid to lower the cost of the emulsion. Up to about 10% by volume of the total of solvent extender and solvent can be solvent extender.

In order to avoid the blistering that occurred in previous efforts at continuous electrophoretic coating, it is necessary that the lowest boiling of the two liquids, the solvent and the precipitant, boil above 120° C. and that the highest boiling of the two liquids boil at least 30° C. higher than the lower boiling liquid. The high boiling points result in a slower evaporation of the two liquids in the curing tower so that the coating does not skin over and blister through too rapid evaporation of solvent. The requirement that the liquids boil at least 30° C. apart makes it easier to recover and separate the two liquids when their vapors are collected and condensed. Preferably, the precipitant is the lower boiling liquid, as separation is then easier.

The emulsion forms easily when the solvent and the precipitant are mixed, and high-shearing agitation is not required. Because the emulsion forms so easily, the resin in the emulsion being deposited can be replenished as it is used by simply adding fresh emulsion. The preferred procedure is to dissolve the polymer in the solvent, then pour that solution into the precipitant and stir gently. No emulsifier is needed to form the emulsion.

A volume ratio of precipitant to solvent of about 1.5:1 to about 4:1 may be used. If too much precipitant is used, the emulsion will have large droplets and a short life. If too much solvent is used, no emulsion forms. A preferred volume ratio of precipitant to solvent, which gives the best emulsions for electrodeposition, is about 1.8 to 1 to about 2.1 to 1. The preferred emulsions are stable, consist of small droplets and have a long shelf life.

The polymer concentration used in the emulsion is preferably about 0.5 to about 1% by weight based on total emulsion weight.

The emulsion components should be highly purified and should not contain water or halogens. The emulsion is typically used at room temperature.

The wire that is to be coated may be of any metal which does not dissolve in the emulsion during electrodeposition or is not attacked by it. For example, nickel, aluminum, silver, iron, or chromium can be used. The preferred metal is nickel coated copper because the nickel coating acts as a barrier against deleterious migration of copper ions into the resin layer. The wire may be round, rectangular, or of any other shape and size; however, the advantages of this invention are most apparent when rectangular wire is used because its edges are hard to coat by any other technique. The wire must be clean, of course, and can be cleaned by standard techniques. It can be coated at speeds up to 75 feet per minute or more, but fast speeds require longer curing towers. Also, larger wires require slower speeds as more heat is required to raise the wire to the enamel cure temperature.

The wire is immersed into the emulsion, passes under a sheave, through the electrode tube, out of the emulsion, and into the curing tower. It is best that the wire pass vertically into and out of the emulsion as a horizontal wire creates problems with coating concentricity and reproducibility.

A direct current electric charge is placed across the wire and the tube electrode, preferably with the wire as the anode because it is easier to place negative charges on the polymer than positive charges. A suitable voltage is about 200 to about 600 volts and a suitable current is about 50 to about 300 milliamperes. Lower voltages result in thinner coatings than higher voltages.

The electrode tube can be made of any inert metal. Short tubes mean that slower wire speeds are necessary but long tubes are less convenient. A suitable length is about 2 to about 24 inches. It is preferable to insulate electrically the outside of the electrode tube if the tube is near the downward-moving wire so that the wire is not coated on the way down before it passes under the bottom sheave. The gap, the distance between the inside of the tube and the outside of the wire passing through it, is preferably about ½ to about 2 inches. At greater electrode distances, the electric field is weaker and coating is less rapid, and at shorter distances, new resin cannot enter the tube fast enough to replace the resin that coats the wire. A perforated electrode tube can be used to overcome this problem.

The resin coated wire then proceeds to the curing tower where the resin is cured. The cure time and temperature will depend upon the characteristics of the particular resin used, but about 450° C. to about 480° C. is a preferred temperature range. It is necessary to adjust the gap, current, voltage, wire speed, tube length, and other factors to obtain a suitable coating thickness in a reasonable time. Some experimentation is normally necessary to obtain satisfactory results.

Usually oven length is fixed. The tower temperature is dictated by the economics of the process and this factor takes account of wire size.

Once the speed is fixed, the current is determined as that needed to coagulate on the anode (wire) a given amount of resin (film thickness) in a given time (as determined by the depth of the cell and wire speed; i.e., residence time).

The voltage is that necessary to sustain the current needed and is dependent on cell size and bath conductivity.

The following example further illustrates this invention.

EXAMPLE

An emulsion was prepared by pouring a solution of 300 ml of a 15% solution in NMP of the polyamic acid of stoichiometrically reacted pyromellitic dianhydride and p,p'-oxydianiline the polyamic acid had a molecular weight of about 85,000 to 100,000. This solution is commercially available from Dupont under the trade designation "PYRE-MLI." The solution was mixed with 2400 ml. of NMP and 60 ml. of methyl imidazole in 8250 ml. of Cellosolve acetate, with continuous stirring.

The electrophoretic cell was similar to that shown in the drawing. The electrode tube was an aluminum cylinder 20 inches long, 3 inches in diameter and was insulated on the outside with heat-shrinkable Teflon. A three inch Teflon pulley was attached to the bottom of the electrode and the electrode was bolted to the bottom of the curing tower and was immersed in a 30 inch high polyethylene tank 6 inches in diameter which contained the emulsion. The wire passed into the tank, under the pulley, up through the electrode, and through a six foot curing tower. The electrode tube was the cathode and the wire the anode, using 480 volts and a current of 190 milliamperes.

A nickel plated round copper wire (AWG 18) was used at a speed of 24 feet per minute. The coating was cured in the tower at 300° C.

The wire coating was smooth and did not blister. It had the following characteristics:
Build: 1.3 mils
Electrical Breakdown: 1.2 kV (twisted pair)
Aging: Cracks on 2X mandrel after aging at 250° C. for 168 hours
Adherence and Flexibility: Passes 1X mandrel, 10% elongation
Elongation and Mandrel: Passes
Heat Shock: Passes 3X mandrel It is believed that the coating was undercured due to relatively short exposure to heat in the tower and that is the reason for its relatively low physical properties. Post-baking at 300° C. for 10 to 20 minutes immediately after curing or curing at higher temperatures is expected to optimize physical properties.

We claim:

1. A method of continuously electrophoretically forming an imide containing polymeric coating on a wire comprising:
    (1) forming an emulsion which comprises:
        (a) about 0.5 to about 1% by weight based on total emulsion weight of a polymer selected from the group consisting of polysulfones, polyamic acids, polyamide-amic acids, polyamide-amic acid esters, and mixtures thereof;
        (b) sufficient amine to form a salt with said polymer or to place a charge on emulsion droplets:
        (c) an organic aprotic solvent for said polymer; and
        (d) a polar precipitant which forms an emulsion with said solvent and in which said polymer is insoluble, selected from the group consisting of hydroxyethyl acetate, ethylene glycol monomethyl ether, and mixtures thereof, where the lowest boiling liquid in said emulsion boils at at least 120° C. and the highest boiling liquid in said emulsion boils at least 30° C. higher than said lowest boiling liquid;
    (2) passing said wire through a conductive tube immersed in said emulsion while applying a D.C. electrical current to said tube and said wire, thereby coating said wire with said polymer; and
    (3) curing said polymer coating on said wire.

2. A method according to claim 1 wherein said polymer is a polyamic acid.

3. A method according to claim 1 wherein said organic aprotic solvent is selected from the group consisting of dimethylsulfoxide, N-methylpyrrolidone, dimethylacetamide, dimethylformamide, and mixtures thereof.

4. A method according to claim 1 wherein said emulsion includes a solvent extender selected from the group consisting of xylene, toluene, cresylic acid, and mixtures thereof, said extender constituting up to 10% by weight of said solvent plus said extender.

5. A method according to claim 1 wherein said emulsion is free of any emulsifier.

6. A method according to claim 1 wherein the volume ratio of said precipitant to said solvent is about 1.5:1 to about 4:1.

7. A method according to claim 1 wherein said polymer is cured by heating.

8. A method according to claim 7 wherein said polymer is cured at about 450° to about 480° C.

9. A method according to claim 1 wherein said emulsion is formed by dissolving said polymer in said solvent and adding said solution to said precipitant.

10. A method according to claim 1 wherein said precipitant has a lower boiling point than said solvent.

11. A method according to claim 1 wherein said precipitant is an ethylene glycol monomethyl ether.

12. A method according to claim 1 wherein the precipitant is hydroxyethyl acetate.

13. A method according to claim 1 wherein said wire is rectangular.

14. A method according to claim 1 wherein said electrical current has a voltage of about 200 to about 600 volts and a current of about 50 to about 300 milliamperes.

15. A method according to claim 1 wherein said tube is vertical.

16. A method according to claim 1 wherein said amine is 1-methyl imidazole.

17. A method according to claim 1 wherein the amount of said amine is about 0.5 to about 3 times stoichiometric when an amic acid is used and about 0.8 to about 1.2 parts by weight when a polysulfone is used.

* * * * *